Nils Evert Fridolf Holmqvist,
Inventor
By Wenderoth, Lind and Ponack
Attorneys

Nils Evert Fridolf Holmqvist
Inventor,
By Wenderoth, Lind and Ponack,
Attorneys

Nils E. F. Holmqvist
Inventor,
By Wenderoth, Lind
and Ponack,
Attorneys

Nils Evert Fridolf Holmqvist
By Wenderoth, Lind and Ponack,
Attorneys

July 7, 1964 N. E. F. HOLMQVIST 3,139,821

DEVICES FOR SETTING A NUMBER PRINTER
BY MEANS OF A DATA TRANSMITTER

Filed Nov. 21, 1961 7 Sheets-Sheet 5

Nils Evert Fridolf Holmqvist,
Inventor
By Wenderoth, Lind and Ponack,
Attorneys

July 7, 1964 N. E. F. HOLMQVIST 3,139,821

DEVICES FOR SETTING A NUMBER PRINTER
BY MEANS OF A DATA TRANSMITTER

Filed Nov. 21, 1961 7 Sheets-Sheet 6

Nils Evert Fridolf Holmqvist,
Inventor
By Wenderoth, Lind and Ponack,
Attorneys

Nils Evert Fridolf Holmqvist,
Inventor
By Wenderoth, Lind and Ponack
attorneys

United States Patent Office 3,139,821
Patented July 7, 1964

3,139,821

DEVICES FOR SETTING A NUMBER PRINTER BY MEANS OF A DATA TRANSMITTER

Nils Evert Fridolf Holmqvist, Malmo, Sweden, assignor to Aktiebolaget Addo, Malmo, Sweden, a corporation of Sweden Filed Nov. 21, 1961, Ser. No. 153,935
6 Claims. (Cl. 101—93)

This invention relates to a device for setting a number printer by means of a data transmitter containing a plurality of denominal orders in each of which a data transmitter contact means is adjustable by means of an operating mechanism into electric contact with either of several data transmitter contacts, viz. one for zero and one or more for a corresponding number of digits other than zero, while the number printer has a number of type bars corresponding to the number of denominal orders in the data transmitter, each of said type bars carrying a row of digit types, comprising zero and said digit or digits other than zero and corresponding to the number of data transmitter contacts in an order of the data transmitter, and said type bars being shiftable through a setting mechanism which for each type bar includes a locking means which is adapted when energized to lock the associated type bar in adjusted position and to be supplied with current by the intermediary of a data receiver. The invention is characterized by the feature that the data receiver contains a number of orders corresponding to the number of type bars and respective orders in the data transmitter, and in each of said number of orders of the data receiver a receiver contact means is shiftable through the setting mechanism in a scanning course into electric contact with data receiver contacts in sequence, there being one such data receiver contact for each of said digit or digits other than zero and for zero, the data transmitter and data receiver contacts arranged for the same digit being electrically interconnected and the data transmitter and data receiver contact means associated with corresponding orders in the data transmitter and the data receiver being each connected to one pole of a source of current, individual to the respective order, in series with the locking means in the respective order of the number printer.

As compared to prior art devices for the same purpose the device suggested according to the invention is simpler and more reliable and it furthermore permits solving the problem, sometimes met, of the data transmitter being only adjustable responsive to zero and one or more digits other than zero whereas the number printer must be able to print signs, such as asterisks, in the orders to the left of the highest order in which a significant digit is printed, while zeros to the right of said highest order must of course be printed as zeros. In other words, the number printer shall treat zeros indicated by the data transmitter, where zeros to the right of the highest significant order of the number are concerned, differently from zeros to the left of the highest significant order of the number. In the device according to the present invention, which has been outlined in the foregoing, this problem is solved by the type bars each having in the row of digit types an additional type for a sign, by the data receiver containing a sign receiver contact individual to each order and intended for said sign, and by each order of the data transmitter except the lowest one being provided with a single-pole switch which has a first and a second terminal and is adapted to be kept closed by the operating mechanism of the respective order only when the data transmitter contact means of the respective order is in electric contact with the data transmitter contact for zero, the switches being connected in series and the sign receiver contact arranged in the highest order of the data receiver being permanently electrically connected to the data transmitter and data receiver contacts for zero and to the first terminal of the switch in the highest order of the data transmitter, while each of the sign receiver contacts arranged in the other orders of the data receiver are electrically connected to the other terminal of the switch in the respective next higher order of the data transmitter.

The problem outlined above of differently treating the zeros indicated by the data transmitter can also be solved by a modification of the device described, in which modified device the data receiver has a single set of receiver contacts and a single receiver contact means which is adapted during its scanning course to be set for zero last, and in which device only the data transmitter and data receiver contacts arranged for the digit or digits other than zero are electrically interconnected, and the data receiver contact means is connected to one pole of all current sources individual to the orders of the number printer and the data transmitter or to one pole of a current source common to all said orders, while the locking devices are connected in series between the other pole of the current source or sources and the respective data transmitter contact means belonging to the same order. This modification of the present invention is characterized by the feature that the data transmitter has a data transmitter contact for zero which contact is individual to each order, and that the sign receiver contact in the data receiver is permanently electrically connected to the data transmitter contact for zero in the highest order of the data transmitter and to the first terminal of the switch provided in the same order, while each of the data transmitter contacts for zero arranged in the other orders of the data transmitter is electrically connected to the other terminal of the switch in the respective next higher order of the data transmitter, and the data receiver contact means is adapted at the end of its scanning course at the adjustment for zero to connect all locking devices (possibly with the exception of the locking device in the highest order) between the poles of the current source or sources without the intermediary of the data transmitter contact means.

For a better understanding the invention will be described in more detail in the following with reference to the accompanying drawings which illustrate some embodiments of the invention. In the drawings.

Figure 1:
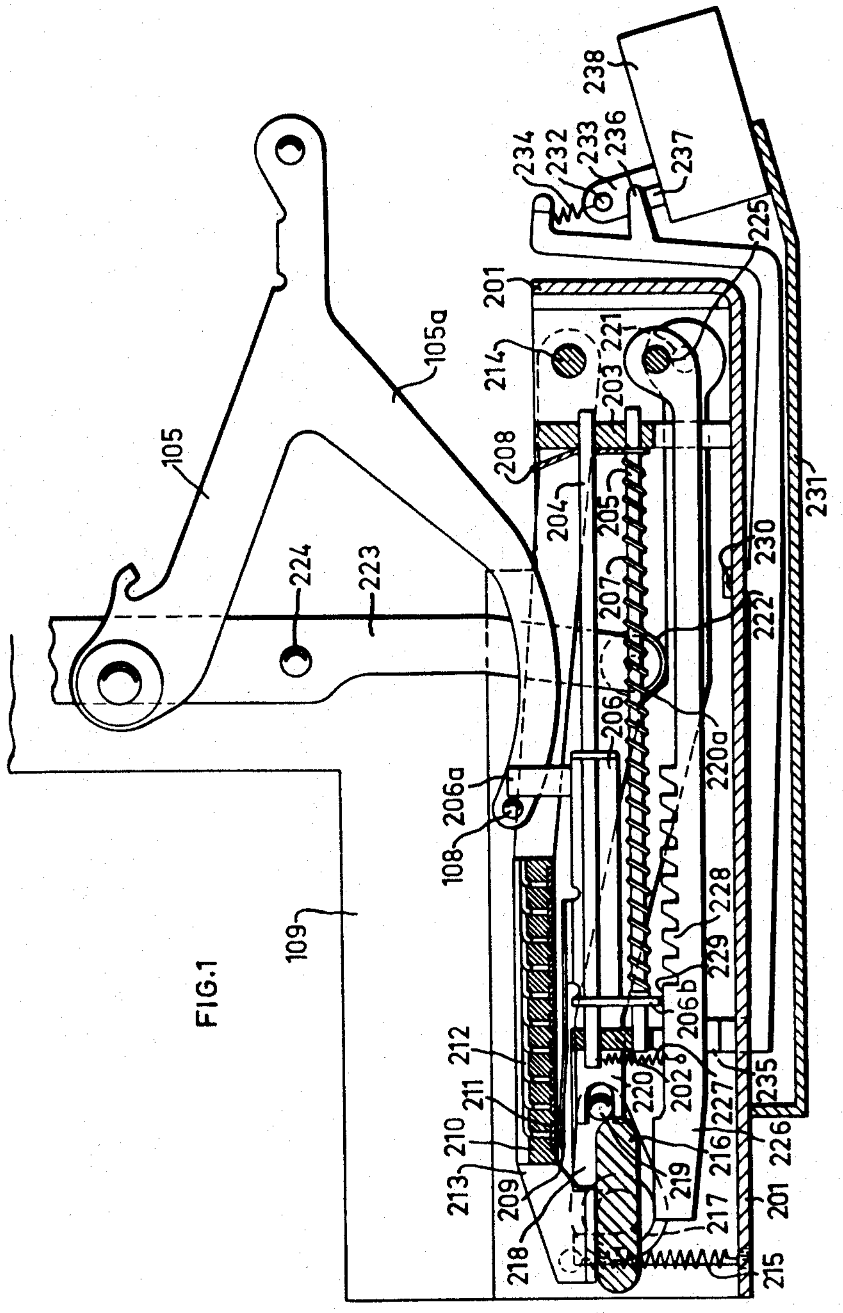
FIG. 1 is a vertical longitudinal section of a data transmitter operated by a calculating machine.
Figure 2:
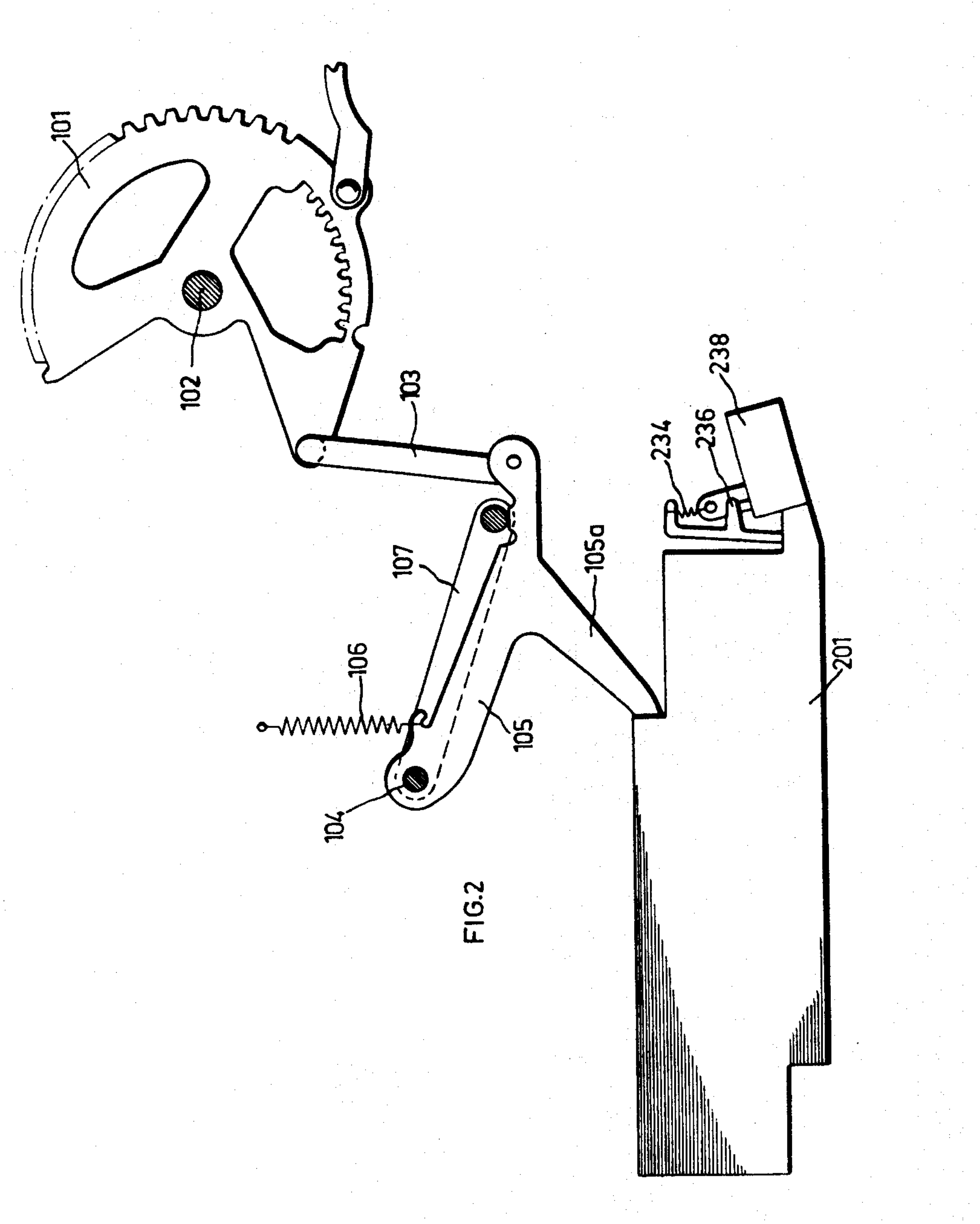
FIG. 2 is a diagrammatic view of the connection of the data transmitter to the calculating machine.
Figure 3:
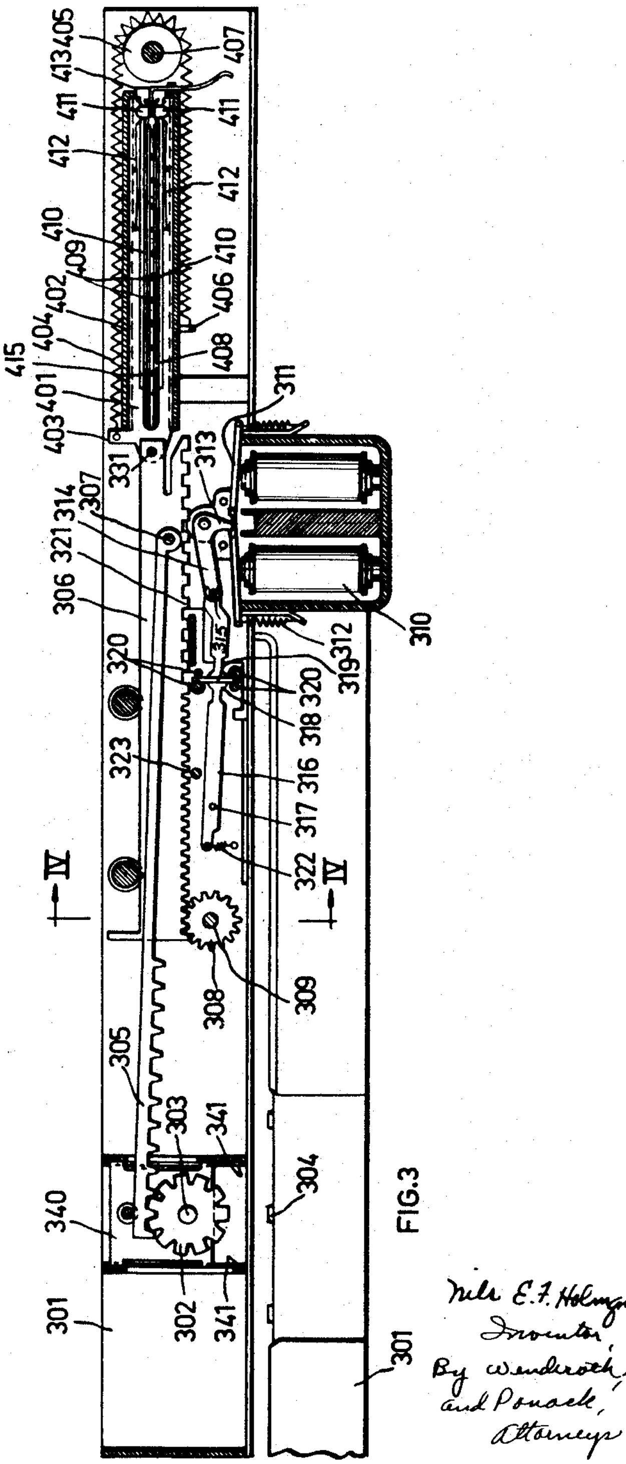
FIG. 3 is a longitudinal section of a number printer with the associated data receiver means.
Figure 4:
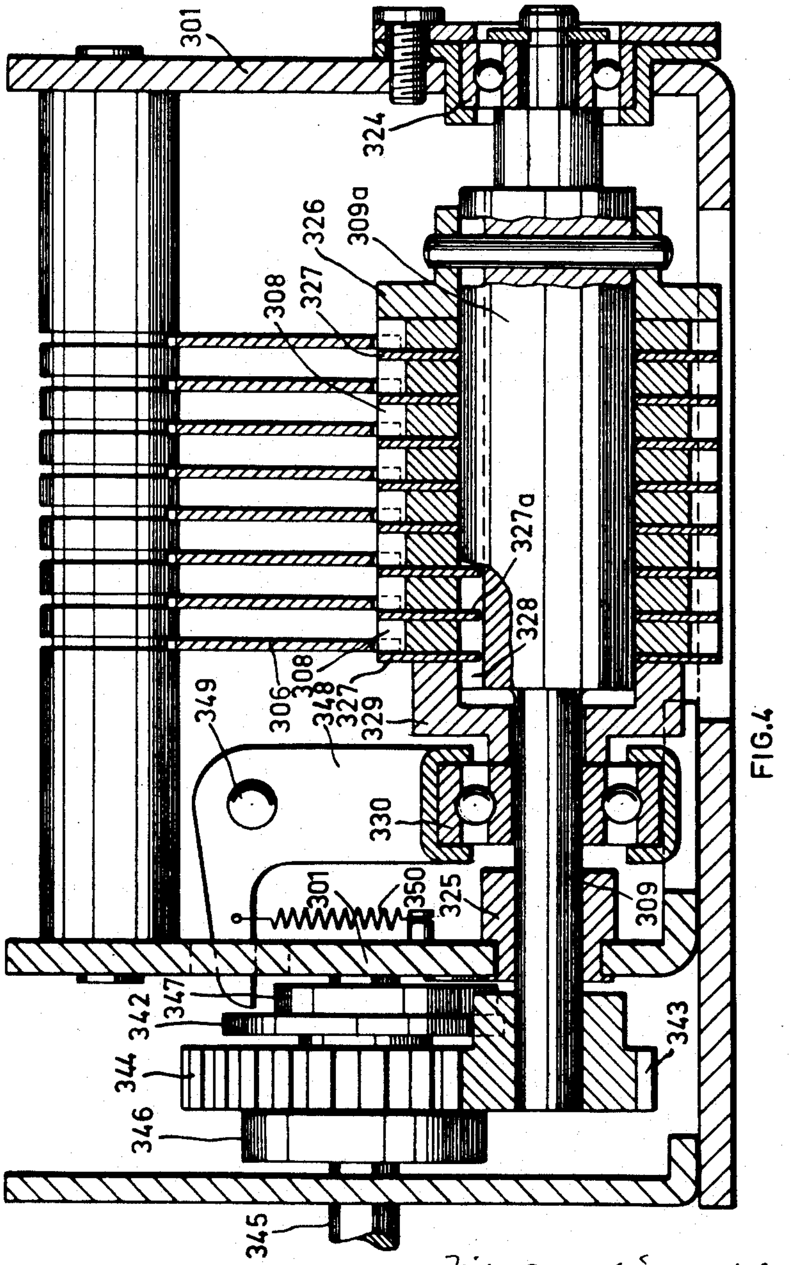
Figure 5:
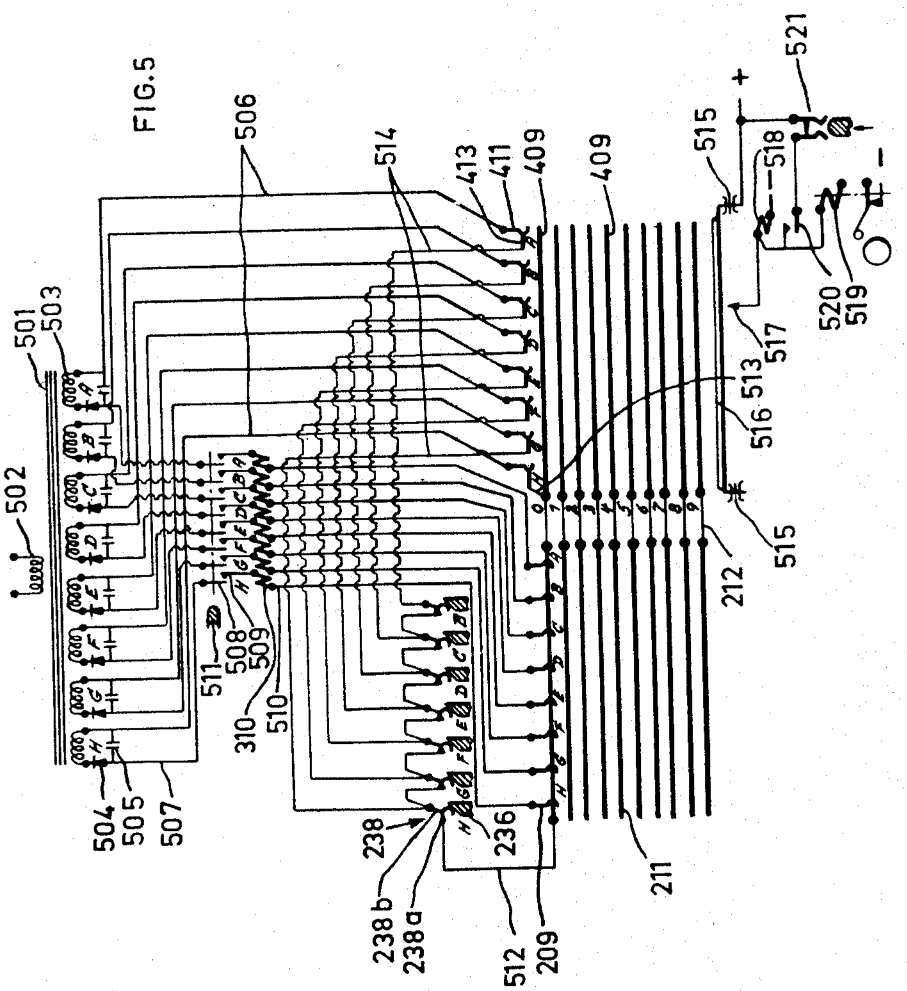
Figure 6:
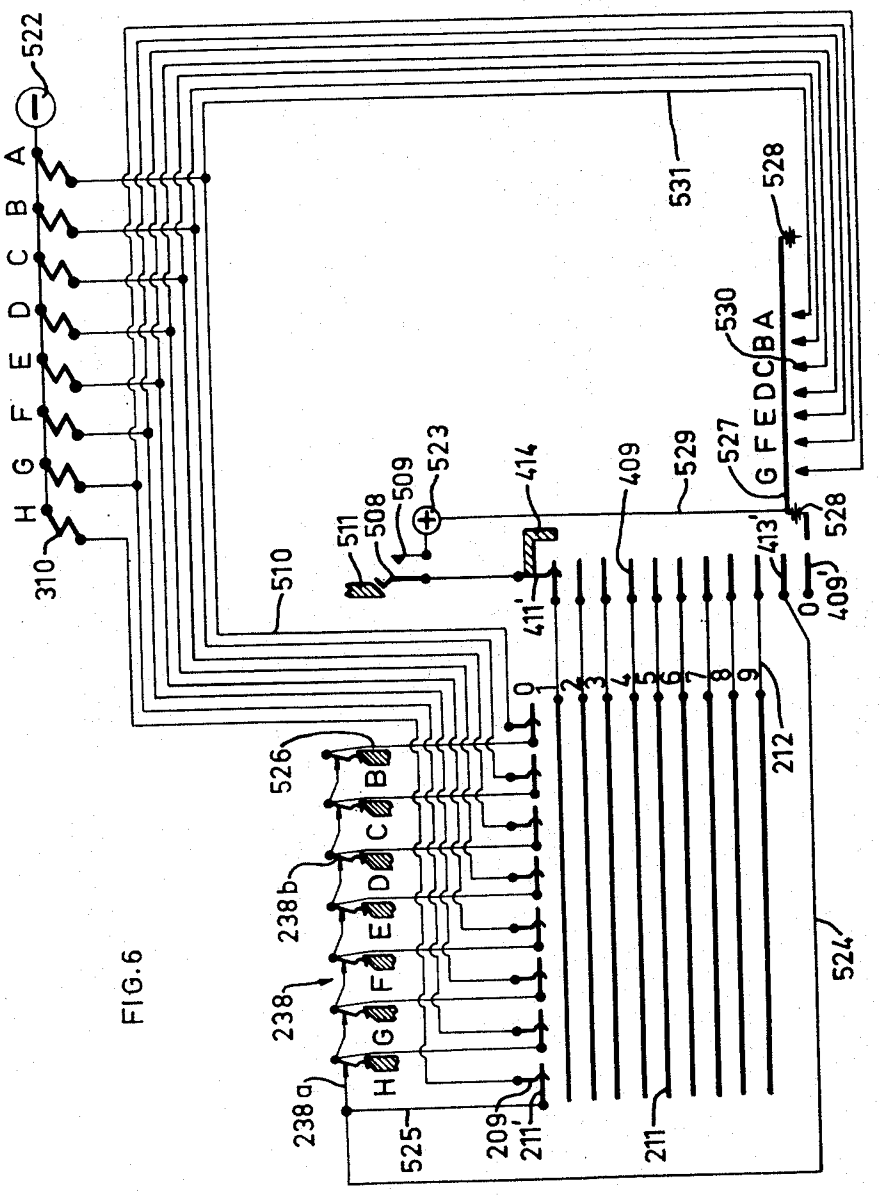
Figure 6A:
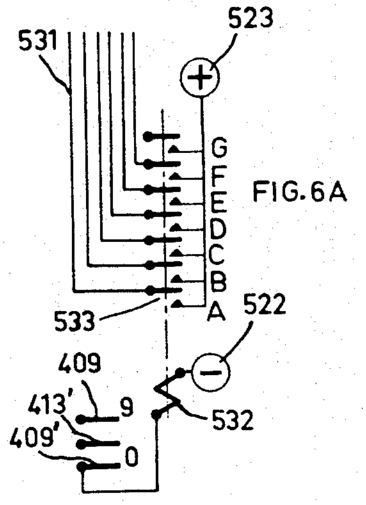
Figure 7:
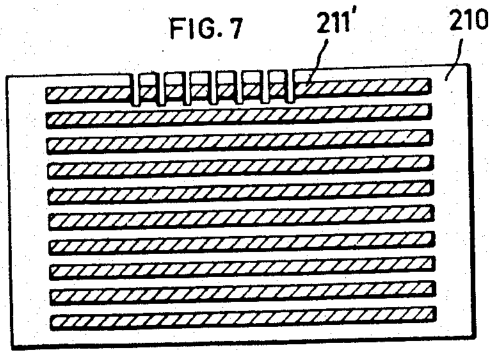

FIG. 4 on a larger scale is an axial section of a friction drive comprised in the number printer, the section being taken on line IV—IV in FIG. 3;

FIG. 5 is an electric wiring diagram of the electric connection between the data transmitter of FIGS. 1 and 2 and the number printer of FIGS. 3 and 4;

FIG. 6 is an electric wiring diagram of a modified device;

FIG. 6A is a view of an alternative of part of the wiring diagram in FIG. 6;

FIG. 7 is a plan view of an arrangement of data transmitter contacts for the modification in FIG. 6.

*The Data Transmitter*

Although the invention can be applied together with data transmitters of many different types, such as weighing machines, meters of physical conditions etc., the invention will be described in the following by way of an embodiment in which the data transmitter is a calculating machine. The calculating machine contains, it is assumed, eight decadic orders and is of a per se known construction so that only the parts of immediate interest in connection with the invention need be shown and described. As will appear from FIG. 2, each order of the calculating machine contains a gear segment 101, and the eight gear segments are freely rotatably mounted in juxtaposition on a shaft 102. Each gear segment 101 is hingedly connected by means of a link 103 to a lever 105 pivotally mounted on a shaft 104 and under the action of a spring 106 which tends to swing the lever 105 counter-clockwise out of the initial position shown in FIG. 2 in which the levers 105 of all orders, when the machine is at rest, are retained by means of the web of a U-shaped member 107 which extends over all levers 105 and is mounted on shaft 104. When the calculating machine effects an operating cycle U-shaped member 107 is swung counter-clockwise as viewed in FIG. 2 through a given angle so that levers 105 can also be swung counter-clockwise under the action of their springs 106 and under simultaneous rotation of the associated gear segments 101 clockwise as viewed in FIG. 2 until said segments are individually stopped in a per se known manner by counter wheels (not shown) engaging the gear segments or stops (not shown) which stops have been set by the keyboard (not shown) of the calculating machine. The angle of rotation of the gear segments and thus of the levers 105 corresponds to the digit set in the respective order of the calculating machine, in such a way that the angle of rotation is practically zero when a zero is set in the respective order or when no zero or significant digit is set in said order, and is at its maximum when digit 9 is set in the order. At the end of the operating cycle of the calculating machine the gear segments 101 and the levers 105 are restored to the initial position shown in FIG. 2 by the U-shaped member 107 being returned clockwise as viewed in FIG. 2 to the initial position shown in this figure while tensioning the springs 106. The eight levers 105 each have one downwardly directed arm 105*a* for setting eight orders in a data transmitter, described in the following, responsive to the digit setting of the gear segments 101.

The data transmitter located beneath levers 105 has an upwardly open frame box 201. In this box there are two electrically insulated partitions 202, 203 and fixed to said partitions are two superimposed guide rods 204, 205 for each order in the data transmitter. Movably mounted in each order on said guide bars 204, 205 is a data transmitter contact means in the form of a slide 206 of electrically conductive material. The slide 206 has an upwardly directed lug 206*a* covered with electrically insulating material, and a spring 207 tends to hold said lug 206*a* applied against a pin 108 on the lever arm 105*a* associated with the same order. Spring 207 which is of electrically conductive material is mounted around the guide bar 205 and interposed between partition 203 and a mounting lug 206*b* on slide 206. Spring 207 serves not only the purpose of keeping lug 206*a* applied against pin 108 but also of establishing a safe electric connection between slide 206 and a tag 208 mounted on partition 203. A contact spring 209 is electrically conductively attached to slide 206. Contact springs 209 of the eight slides 206 are adapted to cooperate with ten contact bars 211 countersunk in the underside of a plate 210 of insulating material and serving as data transmitter contacts. Said contact bars 211 extend in parallel to each other at right angles to the direction of motion of contact springs 209 and are common to all eight orders in the data transmitter. In the manner described in the following contact bars 211 can be connected to a control circuit by means of connecting lines 212. Plate 210 is disposed between, and fixed to, two levers 213 (only one is visible in FIG. 1) which are mounted for swinging movement on a shaft 214 in the frame box 201. The free ends of levers 213 are kept pressed against a cam 216 of insulating material by tension springs 215 (only one is visible in FIG. 1) which are expanded between said free lever ends and the frame box 201. Said cam 216 is pivotally mounted on the frame box on studs 217. Attached to the stud 217 shown by dotted lines in FIG.1, is an arm 218 having a pin 219 thereon which is embraced by the fork-shaped end of a lever 220 mounted in the frame box 201 on a pin 221. The lever 220 is provided with a cam shoulder 220*a* which is adapted to cooperate with a roller 222 on the lower end of a lever 223 mounted on the frame 109 of the calculating machine by means of a pin 224.

Eight locking levers 226, one for each order in the data transmitter, are mounted on a shaft 225 of insulating material in the frame box 201. The free end of each lever 226 is within the operating range of cam 216, and a spring 227 expanded between lever 226 and guide rod 204 in the respective order tends to hold lever 226 applied against the lower edge of the mounting lug 206*b* of the slide 206. Within the range of motion of lug 206*b* lever 226 has eight locking teeth 228 the crests of which are coplanar with that edge portion 229 of lever 226, against which mounting lug 206*b* is applied in the position thereof shown in FIG. 1.

A two-arm lever 231 is mounted beneath each locking lever 226 in the frame box 201 by means of a pivot pin 230. Expanded between one arm of lever 231 and a pin 232 on a lug 233 of the frame box 201 is a spring 234 which tends to hold a block 235 of insulating material disposed on the other arm of lever 231 pressed against the underside of the locking lever 226 arranged in the same order. The arm of lever 231 which is connected to spring 234 has a nose 236 which bears against an operating piston 237 of a switch 238 disposed on the frame box 201.

The initial position, shown in FIG. 1, of the data transmitter corresponds to the initial position of levers 105 and gear segments 101 in the calculating machine, i.e. gear segments 101 are set for zero. In this position contact spring 209 in each order bears against the contact bar 211 farthest to the left in FIG. 1 which thus corresponds to zero, while the contact bars 211 to the right thereof represent in sequence digits 1 to 9. The mounting lug 206*b* of the slide 206 bears against the edge portion 229 of locking lever 226 and thus keeps said locking lever in a swung position in which the nose 236 of lever 231 allows the operating piston 237 of switch 238 to take a raised position in which the switch is closed. If the calculating machine is now allowed to effect an operating cycle the drive of the calculating machine first swings lever 223 by means of a cam or like member in a manner obvious to those skilled in the art clockwise as viewed in FIG. 1 through a given angle so that roller 222 presses lever 220 downward whereby arm 218 and thus cam 216 are rotated clockwise as viewed in FIG. 1. Cam 216 thereby swings levers 213 upward and locking levers 226 downward. If the mounting lugs 206*b* of any of slides 206 during the immediately preceding machine cycle have been brought into engagement with any of the locking teeth 228 of levers 226 in a manner to be described in the following, these mounting lugs 206*b* are disengaged from locking teeth 228 by the above mentioned downward swinging of locking levers 226 so that springs 227 can return the associated slides 206 to the initial position shown in FIG. 1, in which the lug 206*a* of the slides bears against pin 108 on the respective lever 105 which at this stage of the operating cycle occupies initial position, i.e. the position for zero. During this return movement of slides 206 contact springs 209 are free from the raised contact bars 211 and plate 210. After this return of slides 206 which during the immediately preceding operating cycle of the machine may have been set for a value other than zero, slides 206 are set by means of levers 105 for the number to be treated during the operating cycle now started. If gear segment 101 in an order is set during this cycle for a digit other than zero, say 3, lever 105 by means of pin 108 shifts slide 206 in the corresponding order of the data transmitter three steps to the right as viewed in FIG. 1. During this shifting of slide 206 contact spring 209 moves still free from the raised plate 212 and its contact bars 211. As soon as the setting of the slides for the number concerned in the operating cycle has been completed by levers 105 the drive of the machine swings lever 223 back to the FIG. 1 position so that cam 216 is returned to FIG. 1 position. This will lower levers 213 and raise levers 226. By the lowering of levers 213 the contact springs 209 of slide 206 are applied against the contact bars 211 which correspond to the digits for which the associated slides 206 have been set by levers 105. The shifting, chosen by way of example above, of a slide 206 for digit 3 thus implies that the contact spring 209 of this slide will come into electric contact with the fourth contact bar 211 from the left in FIG. 1, which bar corresponds to digit 3. By the upward swinging movement of the locking lever 226 associated with this slide the mounting lug 206*b* of said slide will engage in the third gap between locking teeth 228, as counted from the left in FIG. 1. This engagement is such that mounting lug 206*b* is above the bottom of the tooth gap on locking lever 226 which is kept pressed against cam 216 by spring 227. In this swung position of lever 226 spring 234 keeps lever 231 swung into application against the lower edge of lever 226, and nose 236 of lever 231 thereby keeps the piston 237 depressed, whereby switch 238 is kept in open position. After gear segments 101 have completed their setting movement and set the slides 206 correspondingly and after cam 216 has been moved to the FIG. 1 position, i.e. slides 206 have been locked by locking teeth 228, all gear segments 101 and levers 105 are returned to initial or zero position for concluding the operating cycle of the calculating machine, but the slides 206 set for digits other than zero are retained in their set positions by the engagement with the associated locking levers 226 against the action of springs 207. Likewise the associated switches 238 of these slides are retained in open position, since the associated locking levers 226 remain in raised position in application against cam 216 in the manner earlier described. The slides 206 whose associated gear segments 101 and levers 105 have not during the operating cycle left the initial position or the position for zero are retained in the position corresponding to zero and shown in FIG. 1, in which the lug 206*a* of the slides bears against the pin 108 of the associated lever 105, while the contact spring 209 on the slides bears against contact bar 211 for zero. When cam 216 was turned during the operating cycle to the FIG. 1 position, the locking lever 226 associated with a slide 206 set for zero could not be swung by spring 227 into application against cam 216 because the mounting lug 206*b* of slide 206 was applied against the edge portion 229 of the locking lever, as is shown in FIG. 1. Thereby locking lever 226 keeps lever 231 in such a swung position that the piston 237 of switch 238 is raised and the switch consequently is closed.

As a summary, the following may be said about the adjusted position of the data transmitter elements from the moment when lever 223 was swung counter-clockwise to the FIG. 1 position up to the beginning of the next operating cycle of the machine. All slides 206 which have been set for a digit other than zero remain in their adjusted positions, and their associated switches 238 are open. All slides 206 set for zero also remain in their adjusted position according to FIG. 1, and their associated switches 238 are closed. The contact springs 209 of all slides 206 bear against some of the contact bars 211, and in each order a circuit can thus be closed in the manner indicated in the following through line 212 connected to the respective contact bar 211, the contact bar proper, contact spring 209, slide 206, spring 207 and tag 208.

*The Number Printer*

The number printer comprises a frame 301 in which eight type wheels 302 are individually mounted for rotation each by means of one shaft 303 on its respective plate 340 which is vertically movable in guides 341 in frame 301 and is held in the raised FIG. 3 position by a spring device (not shown). Each type wheel has eleven teeth, and on the free end surfaces of said teeth there are types for digits 0–9 and an asterisk or some other sign. In the present instance the type wheels are intended to print a number on a page of a bank customer's pass-book (not shown) which rests in open position on a flat base 304. Between the book page and the type wheels there is a carbon ribbon (not shown), and printing is effected by pressing the type wheels down against the carbon ribbon and the book page by a temporary downward movement of plates 340 by means of a per se known printing mechanism (not shown), say a pressure hammer mechanism known from listing calculating machines. The types for digit 0–9 are used for printing the digits of a number, while the asterisk types are used for printing asterisks ahead of the number, which make a falsification more difficult. In other words, asterisks shall be printed in the orders higher than the highest significant order in the printer where the type wheel 302 has been set for a digit other than zero. In the initial position of the parts, shown in FIG. 3, the type wheels 302 are set in such a way as to operate with their asterisk types in printing. If the type wheels are shifted one tooth pitch counter-clockwise from the position shown they print with the type for zero, at a shift through two steps with the type for digit 1 etc. In each order of the number printer the type wheel 302 is individually adjustable by means of a rack 305 meshing with the teeth of the type wheel and pivotally attached by means of a pin 307 to a rack 306 movably mounted in the frame 301.

Racks 306 are engaged each with one drive wheel 308, and the eight gears 308 are mounted for rotation on a common shaft 309 to which they can be connected with friction allowing them to slip, in a manner described in the following. When at the beginning of a printing cycle, shaft 309 is rotated counter-clockwise as viewed in FIG. 3 gears 308 thus drive racks 306 to the left in FIG. 3 through a total distance of ten steps unless a locking device described in the following has stopped the respective rack 306 beforehand.

The locking device individual to each order in the number printer has an electromagnet 310 which upon energization attracts an armature 311 against the action of a spring 312. When the electromagnet is deenergized spring 312 keeps armature 311 raised in such a way that a nose 313 on a lever 314 engages in a recess in the armature 311. Lever 314 engages by means of a pin 315 with the fork-shaped end of a locking lever 316 which is mounted on frame 301 by means of a shaft 317. Passed onto a mounting portion 318 of lever 316 is a locking rod 319 which is movable between upper and lower guide shafts 320, and in the initial position shown is situated beneath the path of movement of a set of locking teeth 321 on rack 306. A spring 322 expanded between frame 301 and one arm of lever 316 tends to swing lever 316 counterclockwise as viewed in FIG. 3 for insertion of the locking rod 319 in the path of movement of teeth 321 on rack 306 but is prevented from doing this, when electromagnet 310 is deenergized, by the nose 313 of lever 314 being applied against one side wall of the recess in armature 311. When electromagnet 310 is energized armature 311 releases nose 313 so that spring 322 can swing lever 316 and move locking rod 319 into engagement between a pair of teeth 321 on the rack 306 to prevent said rack and thus the drive wheel 308 from further taking part in the movement of shaft 309, a slip occurring between gear 308 and shaft 309. At the end of a printing cycle of the number printer the levers 316 released during the printing cycle are returned to the FIG. 3 position by means of a restoring bar 323 engaging over all levers 316, which bar is temporarily lowered for this return movement by means of a cam disk 342 (FIG. 4) from the FIG. 3 position.

FIG. 4 on a larger scale shows the mechanism which over shaft 309 drives gears 308 individually by friction. Shaft 309 is mounted in the side walls of frame 301 through the intermediary of a ball bearing 324 and a friction bearing 325. Exteriorly of friction bearing 325, shaft 309 carries a gear 343 which engages another gear 344 which is mounted for rotation on a shaft 345 driven by a motor (not shown) and to which the gear 344 can be temporarily coupled by means of a diagrammatically indicated one-cycle clutch 346. A printing cycle of the number printer is released by connecting the one-cycle clutch so that gear 344 makes one revolution and rotates shaft 309 approximately two revolutions during the printing cycle. Apart from driving gear 343 gear 344 also drives the mechanism producing the printing course of the type wheels 302, in a known manner not shown. Attached to gear 344 furthermore are the aforementioned cam 342 for temporarily lowering the restoring bar 323 at the end of the printing cycle, and a cam 347 to be described in the following, so that these cams are rotated one revolution during each printing cycle.

The eight gears 308 are freely rotatably mounted on the intermediate portion 309*a* on the shaft 309, which portion is of enlarged diameter. The gear 308 farthest to the right in FIG. 4 can support itself against a flange 326 on shaft portion 309*a*, and friction disks 327 are inserted between the successive gears 308. A friction disk 327 is also applied against the left-hand side of the gear 308 farthest to the left in FIG. 4. All friction disks 327 are axially movable on the shaft portion 309*a* but non-rotatably interconnected with said portion by one or more noses 327*a* on said disks 327 engaging in one or more axial grooves 328 provided in the shaft portion 309*a*. A sleeve 329 which is axially movable on the shaft 309 and can be pressed against the friction disk 327 farthest to the left in FIG. 4 with the aid of a ball bearing 330, which is slidable along shaft 309, is in bearing application against said friction disk 327. Ball bearing 330 is shifted by means of a bellcrank lever 348 engaging the ball bearing and pivotally mounted on the machine frame by means of a pin 349. Bellcrank lever 348 is under the action of a spring 350 which tends to swing lever 348 in such a way that ball bearing 330 is pressed against sleeve 329. In the initial position of the parts the aforementioned cam 347 keeps lever 348 swung clockwise from the FIG. 4 position against the action of spring 350 so that ball bearing 330 does not exert any pressure on the sleeve 329. Immediately at the beginning of a printing cycle, cam 347, however, allows spring 350 to swing the lever counter-clockwise to the FIG. 4 position in which spring 350 over ball bearing 330 and sleeve 329 compresses the pack of friction disks 327 and gears 308 againts flange 326 so that gears 308 are carried along in the rotation of shaft 309 due to the frictional engagement between disks 327 and gears 308. Gears 308 cause racks 306 to move in an adjusting stroke to the left as viewed in FIG. 3. When locking rod 319 in some order stops rack 306 during this adjusting stroke the associated gear 308 is of course also stopped so that there occurs a slip between said gear and the adjoining friction disks 327 or flange 326, which positively take part in the rotation of shaft 309. Shaft 309 is rotated through a considerably larger angle than the minimum angle required in order that gears 308 may advance racks 306 and type wheels 302 ten type pitches partly for compensating slipping of gears 308 relative to shaft 309 and partly in order that a rack 306 that may not have been locked during the adjustment by the associated locking rod 319 may actuate a signalling or blocking means to be described in the following. At the end of the adjusting stroke ball bearing 330 is moved to the left in FIG. 4 by cam 347 and lever 348 so that the application pressure of sleeve 329 is cancelled, whereby gears 308 can be rotated with very small friction relative to shaft 309 by means of racks 306 when these are returned to initial position in a manner to be described in the following.

*The Data Receiver*

Racks 306 in the number printer are electrically insulatingly connected each by means of a pin 331 to one slide 401 of electrically conductive material in a data receiver which receives electric pulses from the data transmitter in a manner to be described in the following to energize electromagnets 310 at such times during the adjusting stroke of racks 306 that the racks and thus the type wheels 302 are arrested in their adjusted positions corresponding to the digit adjusting positions of the data transmitter contact springs 209 in the corresponding orders of the data transmitter. The data receiver slides 401 are movably mounted in grooves on the upper side and at the underside, respectively, of a box 402 of electrically insulating material. Slides 401 have an upwardly directed lug 403 in which one end of an electrically conductive spring 404 is anchored in an electrically conductive manner, said spring passing over a roller 405 of electrically insulating material which is disposed at one end of box 402 to the underside of said box where the other end of spring 404 is fixed to a soldering stud 406 attached to the box. Rollers 405 of springs 404 are freely rotatably mounted on a shaft 407 in frame 301. Springs 404 serve on one hand to return racks 306 at the end of the printing cycle of the number printer when sleeve 329 cancels the compression of the pack of gears 308 and friction disks 327, and on the other to constitute an electric connection between the respective slide 401 and the associated tag 406.

Each slide 401 has a slot 408 which is open to the right in FIG. 3, to permit free passage of eleven parallel contact rods 409, 415 which are secured in the insulating side walls of box 402. Mounted in the slot 408 of each slide 401 are upper and lower electrically conductive contact spring 410 which at their rear ends carry contact pieces 411 and whose front ends are electrically conductively connected to the respective slide 401. Springs 410 are coated with electrically insulating material throughout their lengths so that they cannot come in electric contact with the contact rods 409, 415 in any other way than by means of their contact pieces 411. Said contact pieces 411 are pressed together by spring wires 412 mounted on slide 401 so that when slide 401 is moved to the left in FIG. 3 they will come in electric contact consecutively with the contact rods 409 serving as data receiver contacts for digits 0–9. Contact bar 415 primarily serves only to guide contact springs 410 but may possibly also be utilized for closing a signalling or blocking circuit when racks 306 by reason of a faulty function of the device have not been locked in any normal adjusting position but move the contact pieces 411 past contact rods 409 into engagement with contact bar 415. In the initial position of the parts, shown in FIG. 3, contact pieces 411 are out of contact with the ten contact rods 409 and are instead in electric contact with a sign receiver contact 413 which is individual to each order in the data receiver and is attached to one end wall of insulating box 402.

*The Electric Operating Circuit*

The above data transmitter and data receiver are electrically interconnected in the way appearing from FIG. 5 to adjust the number printer corresponding to the adjustment of the calculating machine. In FIG. 5 the ten contact bars 211 of the data transmitter are shown at the bottom to the left and they are connected by lines 212 to the ten contact rods 409 of the data receiver which are shown at the bottom to the right in FIG. 5, in such a way that contact bars 211 and contact bars 409 arranged for the same digit are electrically interconnected. In the embodiment chosen by way of example it is assumed that the contact bar and contact rod, respectively, for zero is situated uppermost while the contact bar and contact rod for digit 9 is situated undermost in FIG. 5, and for a clearer showing the digits are indicated within the area of lines 212. The contact means 209 of the data transmitter and the contact means 411 of the data receiver are shown in the initial position of the parts in FIG. 5, and for a clearer showing capitals have been allotted to the corresponding orders in the data transmitter and the data receiver and within other parts of the system, the letter A having been allotted to the lowest order and the letter H to the highest order. FIG. 5 also shows the noses 236 of levers 231 arranged in the data transmitter (FIG. 1), which noses operate switches 238. It should be noticed that the lowest order A in the data transmitter has no switch 238, as will appear from FIG. 5.

For supply of current, use is made of a transformer 501 which has the primary winding 502 connected to an alternating current network and which has eight secondary windings 503 forming individual current sources for the eight orders A–H in the system. The alternating voltage induced in each secondary winding 503 is applied to a diode 504 which passes a pulsing direct current which is smoothed out by a condenser 505 so that the system is fed with direct current. One terminal of each secondary winding 503 is connected through a line 506 to contact means 411 in the corresponding order of the data receiver. The connection between diode 504 and condenser 505 in each order is connected through a line 507 to a corresponding movable contact 508 in an eight-pole switch the fixed contacts 509 of which are connected to one terminal of electromagnet 310 in the respective order. The other terminal of electromagnet 310 is connected through a line 510 to contact means 209 in the respective order of the data transmitter. The eight-pole switch 508, 509 can be closed at the beginning of a printing cycle of the number printer by its operating means 511 being actuated by a cam (not shown) driven by the drive gear 344 of the number printer.

Switches 238 have a fixed contact 238*a* and a movable contact 238*b*. Switches 238 are connected in series in such a way that the fixed contact 238*a* of the switch in order B is connected to the movable contact 238*b* in order C, and the fixed contact of the latter is connected to the movable contact in the switch of order D etc. The fixed contact 238*a* of the switch in order H is fixedly connected through a line 512 to contact bar 211 for zero. Sign contact 413 in the highest order H of the data receiver is directly connected through a line 513 to contact bar 409 for zero, while sign contacts 413 in the orders A–G of the data receiver are connected each through a line 514 to the movable contact 238*b* in switch 238 in the next higher order of the data transmitter, i.e. contact 413 in data receiver order A is connected to switch 238 in order B of the data transmitter etc.

*The Function*

To describe how the data transmitter can adjust the data receiver and thereby the number printer corresponding to the setting of gear segments 101 in the calculating machine in such a way that zeros sensed by the data transmitter from the calculating machine are printed by the number printer as zeros when being positioned to the right of the highest significant order but as asterisks when being positioned to the left of the highest significant order although the data transmitter does not contain any position of adjustment for asterisks, it may be assumed for the sake of simplicity that all orders in the data transmitter are kept adjusted for zero except for order E where adjustment has been made say for digit 3. To this end data transmitter contact means 209 in order E has been moved in touch with contact bar 211 for digit 3 and simultaneously switch 238 in order E has been opened while the remaining orders in the data transmitter take the FIG. 5 position. At the beginning of the operating cycle of the number printer switch 508 is closed. This will immediately establish closed circuits in orders F–H. The circuit for order H goes from secondary winding 503 through line 506 to contact means 411, sign contact 413, line 513, line 212 for zero, contact bar 211 for zero, the data transmitter contact means 209 of order H, the associated line 510, electromagnet 310, closed contact group 508, 509 for order H and back to secondary winding 503 for order H. As for order G the circuit goes from current source 503 through line 506 to contact means 411, sign contact 513, line 514 to closed switch 238 in the order H of the data transmitter and further through line 512 to contact bar 211 for zero, data transmitter contact means 209 in order G, the associated line 510, electromagnet 310 of order G and closed switch 508, 509 back to the current source. The circuit for order F corresponds to the circuit for order G except that the current from sign contact 413 in order F of the data receiver goes through the associated line 514 to closed switch 238 in the order G of the data transmitter and thence via closed switch 238 in order H of the data transmitter and further through line 512 to data transmitter contact bar 211 for zero. As a consequence electromagnets 310 for orders F–H are energized immediately at the start of the printing cycle so that the associated racks 306 are immediately stopped by locking rods 319 (FIG. 3), whereby the associated type wheels 302 will print with the asterisk type.

In order E there is not immediately established a closed circuit, since sign contact 413 in the data receiver is connected in a manner analogous to what has been described as for orders F and G, to contact bar 211 for zero, in the data transmitter, while contact means 209 in order E of the data transmitter is set in contact with contact bar 211 for digit 3. Consequently, contact means 411 in order E of the data receiver will leave sign contact 413 and in sequence slide over contact rods 409 for zero and digits 1 and 2. When contact means 411 in order E of the data receiver then arrives at contact rod 409 for digit 3, the circuit in order E is closed. The current flows from current source 503 in order E through the associated line 506, contact means 411, contact rod 409 for digit 3, the associated line 212, contact bar 211 for digit 3 in the data transmitter, contact means in order E of the data transmitter, which contact means is in contact with said contact bar 211, the associated line 510, electromagnet 310 in order E and further via switch 508, 509 back to the current source. Electromagnet 310 in order E is thus energized and stops rack 306 in order E after an adjustment through four steps so that the associated type wheel 302 will print with the type for digit 3.

In orders A–D where the data transmitter contact means 209 are in contact with contact bar 211 for zero there is not either obtained any immediately closed circuit since the connection of sign contacts 413 with contact bar 211 for zero in the data transmitter is open at switch 238 in this order, which switch was opened by adjustment of the data transmitter contact means 209 in order E, as may easily be seen by an inspection of FIG. 5. Data receiver contact means 411 in orders A–D will consequently during the adjustment stroke of the printer leave sign contacts 413. However, as they have moved one step so as to come in contact with contact rod 409 for zero the circuits of orders A–D are closed in that the current from current source 503 flows through the respective line 506 and contact means 411 to the contact rod 409 for zero and further through the associated line 212 to contact bar 211 for zero, the data transmitter contact means 209 connected to this contact bar, the respective line 510, electromagnet 310 and switches 508, 509 back to the respective current source. Racks 306 in orders A–D are thereby stopped after an adjustment through one step so that the associated type wheels 302 will print with the type for zero.

Switch 511 is again opened close to the end of the operating cycle of the number printer just before restoring rod 323 (FIG. 3) restores the locking rods 319 so that the armatures 311 of electromagnets 310 can engage noses 313 to retain locking rods 319 in restored position.

FIG. 5 diagrammatically shows a signal means which indicates scanning errors in the data receiver. Should a contact means 411 not close its associated circuit when it reaches the correct contact rod 409 or 413 it will continue its movement past the contact rod 409 for digit 9. This is exploited for error indication. In the path of movement of contact means 411 beyond contact rod 409 for digit 9 or in the corresponding manner in the path of movement of some parts connected to contact means 411 (i.e. racks 306 in FIG. 3) there is arranged according to FIG. 5 a U-shaped member 516 which is able to swing about bearings 515 and which is connected to the positive pole of a source of current (not shown) and which when some contact means 411 or part connected therewith hits it, is swung into contact with its fixed contact 517 which is connected to the negative pole of the current source over a relay coil 518 and an electric bell 519 connected in parallel therewith (or any other signalling and/or blocking means). At failure of locking any contact means 411 relay 518 is thus cut in, and bell 519 gives a signal. In order that this signal may be able to continue also after the erroneous operating cycle of the data receiver, relay 518 at the cutting-in closes a holding contact 520 which is connected to the positive pole of the current source over a switch 521 which can be opened manually when it is desired to interrupt the signal.

*Modified Embodiment*

FIGS. 6, 6A and 7 diagrammatically show certain details of a modification in which there is required in the data receiver but a single data receiver contact means 411' common to all orders of the number printer. In this modification the data transmitter is designed in exactly the same manner as that described in the foregoing in connection with FIGS. 1 and 2, with the exception, however, that contact bar 211' on plate 210 for zero is divided into eight individual contact pieces for the eight orders of the data transmitter, as will appear from FIG. 7. The number printer may be designed in the same way as that described in connection with FIGS. 3 and 4, with the exceptions, however, that racks 306 of the orders are directly connected to restoring springs 404 and not connected to any contact slides 401, and that as mentioned above the data receiver has but a single data receiver contact means the slide of which corresponds to one of slides 401 in FIG. 3 and is connected with a ninth rack corresponding to racks 306 in FIG. 3 and engaged with a gear on shaft 309, which gear corresponds to gears 308 in FIG. 3. This ninth rack has no locking teeth 321 and associated locking means operated by an electromagnet 310. The gear engaging this ninth rack and drivable by shaft 309 by friction in the same way as gears 308 in FIGS. 3 and 4, should preferably have a slightly smaller number of teeth than gears 308 belonging to the orders, in order that the ninth rack shall be advanced more slowly than racks 306 belonging to the orders. The ninth rack carries a rod extending across the left ends (FIG. 3) of the racks 306 belonging to the orders in order to safeguard that racks 306 belonging to the orders are advanced under slipping of their associated gears 308 exactly at the same time and with the same speed as said ninth rack. In electrical respect there are further differences between the embodiment first described and the modified embodiment, and these differences will appear from the following description of the wiring diagram in FIG. 6.

In the embodiment according to FIG. 6 there is used a current source common to all orders although it would be possible also to use current sources individual to the orders. One terminal of electromagnets 310 is thus connected to the negative pole 522 of the common current source, and the positive pole 523 of the current source is connected to the data receiver contact means 411' through the switch 508, 509 which in the present instance is but a single-pole switch and the operating member 511 of which is actuated by the number printer in the same way as in the embodiment according to FIGS. 1–5.

The other terminal of the electromagnets 310 of the different orders A–H is individually connected through a line 510 to the data transmitter contact means 209 in the respective corresponding order A–H in the data transmitter. The data transmitter contact means 209 are applied in initial position against contact pieces 211' for zero, which are individual to orders A–H, while the data receiver contact means 411' in initial position bears against contact rod 409 for digit 1, which is the first contact rod in the row of contact rods in the receiver, which is swept by the data receiver contact means 411' in the scanning course. Data transmitter contact bars 211 for digits 1–9 are connected through lines 212 to contact bars 409 of the data receiver for the respective corresponding digit. During its scanning course the data receiver contact means 411' last touches data receiver contact bar 409' for zero, which in FIG. 6 has no electric connection, and before that contact means 411' touches contact rod 413' for the sign, i.e. the asterisk. Contact rod 413' is directly connected through a line 524 to the fixed contact **238*a* of switch 238 in the highest order H of the data transmitter, and to this fixed contact also contact piece 211' in the highest order H of the data transmitter is connected through a line 525. Same as in the embodiment according to FIG. 5 switches 238 in orders B–H of the data transmitter are connected in series. In FIG. 6 contact pieces 211' for zero in orders A–G are connected through a line 526 to the movable contact 238*b* in switch 238** in the next higher order.

When data receiver contact means 411' at the end of its scanning course arrives at contact bar 409' for zero an abutment 414 of insulating material disposed on the data receiver contact means meets a U-shaped member 527 of electrically conductive material, which is pivotally mounted in bearings 528 and electrically connected to the positive pole 523 of the current source through a line 529, and swings U-shaped member 527 into electric contact with seven fixed contacts 530 for orders A–G. These fixed contacts 530 are connected through lines 531 to the respective electromagnet 310 and line 510 belonging to the corresponding order.

The function of the device shown in FIG. 6 will be described under the assumption that only the data transmitter contact means 209 in order E has been adjusted for a digit other than zero, say 3. After the drive of the number printer has closed switch 508, 509 data receiver contact means 411' begins to scan the contact pieces of the data receiver. When contact means 411' arrives at the contact rod 409 for digit 3 the circuit for order E is temporarily closed, the current flowing from the positive pole 523 of the current source through closed switch 508, 509, contact means 411', contact bar 409 for digit 3, the associated line 212, and data transmitter contact bar 211 for digit 3, the contact means 209 in order E of the data transmitter, which contact means is in contact with said contact bar 211, the associated line 510 and electromagnet 310 in order E to the negative pole 522 of the current source. Consequently, rack 306 of order E (FIG. 3) is stopped in the adjusting position for digit 3. When data receiver contact means 411' then leaves contact rod 409 for digit 3 the described circuit it is true is broken by electromagnet 310 of order E but the locking of the associated rack nevertheless remains by the action of spring 322 (FIG. 3) until the number printer has been restored in the manner described already. When data receiver contact means 411' reaches contact rod 413', circuits are closed through electromagnets 310 of orders F–H, the current for the three circuits flowing in common from the positive pole 523 through closed switch 508, 509, contact means 411', contact bar 413' and line 524, whereupon the current is divided to the three circuits. From line 524 the current thus passes for order H directly through line 525 of this order, while the current for order G flows from line 524 over closed switch 238 in order H to line 525 of order G, and the current for order F flows from line 524 over closed switches 238 in orders H and G to line 525 of order F. From the respective line 525 in orders F–H the current flows further to contact piece 211' of the respective order, the associated contact means 209 and line 510 to electromagnet 310 of the respective order and further to the negative pole 522 of the current source. Electromagnets 310 in orders F–H are consequently energized so that the associated racks 306 (FIG. 3) are locked in position for printing the asterisk. It should be observed in this connection that the type wheels 302 of the orders (FIG. 3) in the embodiment according to FIG. 6 naturally must have the types arranged in the same sequence as that in which data receiver contact means 411' comes in contact with the different contact rods 409, 413' and 409'.

When contact means 411' gets in touch with contact rod 413' circuits through electromagnets 310 for orders A–D are not closed although the data transmitter contact means 209 of these orders are in touch with their contact pieces 211' for zero like contact means 209 in orders F–H since the connection between line 524 and contact pieces 211' for zero in orders A–D is open in switch 238 in order E, because this switch has been opened by the adjustment of data transmitter contact means 209 in order E for a digit other than zero. Electromagnets 310 of orders A–D are energized instead when data receiver contact means 411' reaches contact rod 409' for zero because abutment 414 of data receiver contact means then actuates U-shaped member 527 so that all the electromagnets 310 in orders A–G are supplied with current from the positive pole 523 of the current source through line 529, U-shaped member 527, contacts 530 and lines 531. Electromagnets 310 in orders A–D are thus energized and block the associated racks 306 (FIG. 3) in position for printing of zeros in these orders. At the same time electromagnets 310 in orders E–G are energized but since these have already released the associated locking devices during earlier stages of the adjusting cycle of the data receiver, this renewed energization of the electromagnets in orders E–G has no influence on the adjusting course. Electromagnet 310 of order H is not connected to any fixed contact coacting with U-shaped member 527 because order H shall always print either an asterisk or some of digits 1–9 but never a zero.

Instead of providing a U-shaped contact member 527 and fixed contacts 530 cooperating therewith for the adjusting position of the data receiver for zero it is possible, as an alternative, to connect according to FIG. 6A contact rod 409' for zero to one terminal of a relay 532 the other terminal of which is connected to the negative pole 522 of the current source. Relay 532 has seven make contacts 535 which are connected on one hand to the positive pole 523 of the current source and on the other to lines 531. When data receiver contact means 411' reaches the contact rod 409' for zero, relay 532 is consequently cut in and closes a circuit through the electromagnets of orders A–G over its make contacts 533.

What I claim and desire to secure by Letters Patent is:

1. A data handling device comprising a data transmitter and a data receiver, said transmitter having a plurality of denominal orders, said receiver having a plurality of denominal orders, the number of said denominal orders in said transmitter being the same as the number of said denominal orders in said receiver, a plurality of movable transmitter contact devices in said transmitter, one for each of said denominal orders, a plurality of digit transmitter contacts in said transmitter, an operating mechanism in said transmitter coupled with said transmitter contact devices for selectively placing a transmitter contact device for each of said denominal orders of said transmitter in electric contact with one of said digit transmitter contacts to represent a selected data to be transmitted to the corresponding denominal order of said receiver, a plurality of digit receiver contacts in said receiver, means individually electrically connecting the corresponding digit transmitter and receiver contacts, a plurality of digit representation means in said receiver one for each of said denominal orders and each being movable through a plurality of setting positions, each position representing one of the digits to be received from the corresponding denominal order of said transmitter, a setting mechanism coupled to said digit representation means for moving each of said digit representation means individually, movable receiver contact means in said receiver coupled to said setting mechanism and shiftable by means of said setting mechanism in a scanning course into electrical contact with said digit receiver contacts in sequence, a plurality of electrically energizable locking means in said receiver, one for each of said denominal orders of said receiver and engagable with said digit representation means for locking said digit representation means corresponding to the same denominal order of said receiver in one of its setting positions during the movement of said digit representation means by means of said setting mechanism when said locking means are energized, electricity source means, means electrically connecting the respective locking means for each of said denominal orders of said receiver individually in series between said transmitter contact device in the corresponding denominal order of said transmitter and one terminal of said electricity source means, and connection means electrically connecting the other terminal of said electricity source means with said receiver contact means.

2. A data handling device according to claim 1 in which said movable receiver contact means and said electricity source means are common to all said locking means.

3. A data handling device according to claim 1, in which said electricity source means comprises a plurality of electricity sources, one for each denominal order of said receiver.

4. A data handling device according to claim 3 in which said movable receiver contact means comprises a movable receiver contact for each of said denominal orders of said receiver, said connection means individually connecting each of said movable receiver contacts with one of said electricity sources.

5. A data handling device comprising a data transmitter and a data receiver, said transmitter having a plurality of denominal orders, said data receiver having a plurality of denominal orders, the number of said denominal orders in said transmitter being the same as the number of denominal orders in said receiver, a plurality of movable transmitter contact devices in said transmitter, one for each of said denominal orders, a plurality of digit transmitter contacts in said transmitter, each representing one of a plurality of digits among which is zero, an operating mechanism in said transmitter coupled with said transmitter contact devices for selectively placing a transmitter contact device for each of said denominal orders of said transmitter into electric contact with one of said digit transmitter contacts to represent a selected data to be transmitted to the corresponding denominal order of said receiver, a plurality of digit receiver contacts in said receiver, each representing one of the same plurality of digits as those represented by said digit transmitter contacts, means individually electrically connecting the corresponding digit transmitted and receiver contacts, a plurality of sign receiver contacts in said receiver, one for each of said denominal orders, a plurality of data representation means in said receiver, one for each of said denominal orders of said receiver and movable through a plurality of setting positions, one position representing a sign and the others respectively representing each one of said plurality of digits, a setting mechanism coupled to said data representation means for moving each of said data representation means individually, a plurality movable receiver contact means in said receiver, one for each of said denominal orders of said receiver and coupled to said setting mechanism and shiftable by means of said setting mechanism in a scanning course into electrical contact with said digit receiver contacts and said sign receiver contacts in sequence, a plurality of electrically energizable locking means in said receiver, one for each of said denominal orders of said receiver and engageable with said data representation means for locking said data representations means corresponding to the same denominal order of said receiver in one of its setting positions during the movement of said data representation means by means of said setting mechanism when said locking means are energized, a plurality of single-pole switches in said transmitter, one for each of said denominal orders of said transmitter beyond the lowest one and each having a first terminal and a second terminal means, coupled with said operating mechanism for holding each of said switches in a closed position only when said transmitter contact device corresponding to the same denominal order of said transmitter as the respective one of said switches is in electric contact with said digit transmitter contact for zero, means electrically connecting said switches in series, means permanently electrically connecting said sign receiver contact for the highest denominal order of said receiver with said digit transmitter and receiver contacts for zero and with said first terminal of said switch in the highest denominal order of said transmitter, means permanently electrically connecting said sign receiver contact in each of said denominal orders of said receiver below the highest one with said second terminal of said switch in the respective next higher denominal order of said transmitter, a plurality of electricity sources, one for each denominal order of said receiver, means electrically connecting the respective locking means for each of said denominal orders of said receiver individually in series between said transmitter contact device for the corresponding denominal order of said transmitter and one terminal of said electricity source for the corresponding denominal order, and connection means individually electrically connecting the other terminal of said electricity source for each denominal order of said receiver with said receiver contact means for the same denominal order of said receiver.

6. A data handling device comprising a data transmitter and a data receiver, said transmitter having a plurality of denominal orders, said receiver having a plurality of denominal orders, the number of said denominal orders in said transmitter being the same as the number of said denominal orders in said receiver, a plurality of movable transmitter contact devices in said transmitter, one for each of said denominal orders, a plurality of zero digit transmitter contacts in said transmitter, one for each of said denominal orders of said transmitter, a plurality of significant digit transmitter contacts in said transmitter, an operating mechanism in said transmitter coupled with said transfer contact devices for selectively placing said transmitter contact device in each of said denominal orders of said transmitter in electric contact with one of said digit transmitter contacts to represent a selected data to be transmitted to the corresponding denominal order of said receiver, a zero digit receiver contact in said receiver, a plurality of significant digit receiver contacts in said receiver one corresponding to each of the plurality of significant digit transmitter contacts in said transmitter, a sign receiver contact in said receiver, means individually electrically connecting corresponding significant digit transmitter and receiver contacts, a plurality of data representation means in said receiver, one for each of said denominal orders of said receiver and each being movable through a plurality of setting positions, one position representing a sign, another representing zero, and the others representing each one of said plurality of significant digits, a setting mechanism coupled to said data representation means for moving each of said data representation means individually, a movable receiver contact device in said receiver and coupled to said setting mechanism for movement in a scanning course into electric contact with said zero digit, significant digit and sign receiver contacts in sequence, said zero digit receiver contact being the last one in the sequence, a plurality of locking means in said receiver, one for each of said denominal orders and engageable with data representation means for locking said data representation means corresponding to the same denominal order of said receiver in one of its setting positions during the movement thereof by means of said setting mechanism when said locking means are energized, a plurality of single-pole switches in said transmitter, one for each of said denominal orders of said transmitter beyond the lowest one and each having a first terminal and a second terminal, means coupled to said operating mechanism for holding each of said switches in a closed position only when said transmitter contact device corresponding to the same denominal order of said transmitter as the respective one of said switches is in electric contact with said zero digit transmitter contact corresponding to the same denominal order of said transmitter as the respective one of said transmitter contact devices, means electrically connecting said switches in series, means permanently electrically connecting said sign receiver contact with said zero digit transmitter contact for the highest denominal order of said transmitter and with said first terminal of said switch for the highest denominal order of said transmitter, means permanently electrically connecting said zero digit transmitter contact in each of said denominal orders of said transmitter below the highest one with said second terminal of said switch in the respective next higher denominal order of said transmitter, and electricity source, means electrically connecting said locking means in each of said denominal orders of said receiver individually in series between said transmitter contact device for the corresponding denominal order of said transmitter and one terminal of said electricity source, connection means electrically connecting the other terminal of said electricity source with said receiver contact device, and means coupled to said receiver contact device for connecting said locking means across said electricity source by-passing said transmitter contact devices when said receiver contact device is moved to said zero digit receiver contact.

References Cited in the file of this patent

UNITED STATES PATENTS

| | | |
|---|---|---|
| 2,811,307 | Ferraro | Oct. 29, 1957 |
| 2,861,739 | Chall et al. | Nov. 25, 1958 |